D. LOOFBOURROW.
Bee-Hives.
No. 134,687. Patented Jan. 7, 1873.
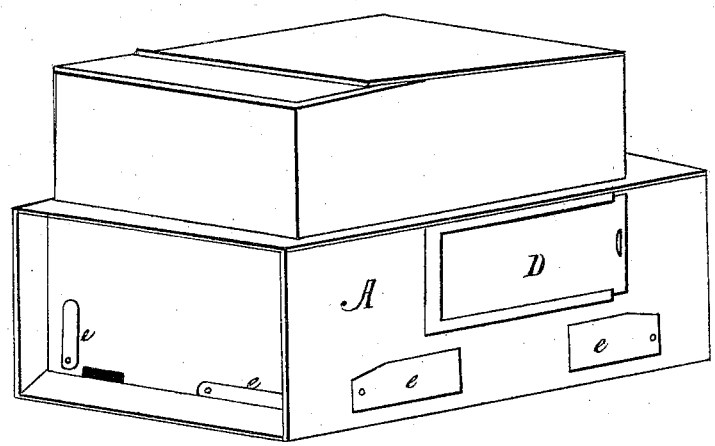
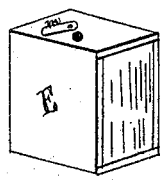 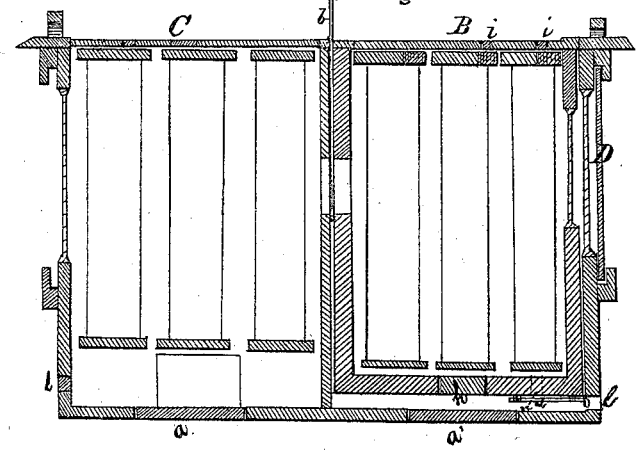 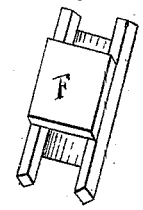
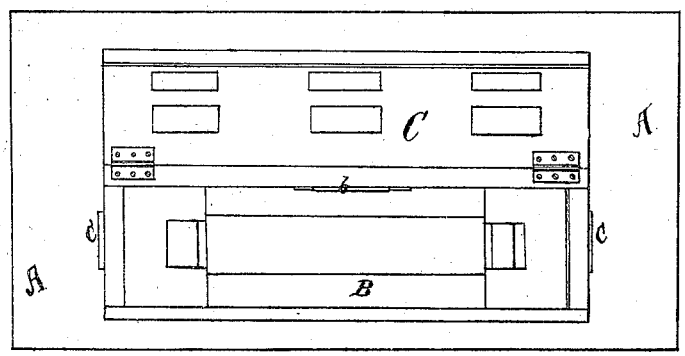
Witnesses:
Parker H. Sweet, Jr.
W. P. Peyton.
Inventor:
David Loofbourrow
by his Atty James L. Norris

UNITED STATES PATENT OFFICE.

DAVID LOOFBOURROW, OF HILLSBOROUGH, IOWA.

IMPROVEMENT IN BEE-HIVES.

Specification forming part of Letters Patent No. 134,687, dated January 7, 1873.

*To all whom it may concern:*

Be it known that I, DAVID LOOFBOURROW, of Hillsborough, county of Henry and State of Iowa, have invented a new and useful Improvement in Bee-Hives; and I do hereby declare the following to be a full and exact description thereof, sufficient to enable others skilled in the art to which my invention appertains to make and use the same, reference being had to the accompanying drawing making part of this specification, in which—

Figure 1 is a perspective view. Fig. 2 is a sectional side view. Fig. 3 is a top-plan view with the portable chamber taken out and the lower falling door open. Fig. 4 is a detached view of a device for conducting bees from an old hive to a new one. Fig. 5 is a perspective view of the honey-cap.

My invention relates to an improved bee-hive; and consists of a box of any desired shape, but preferably in the form of a parallelogram, having two chambers situated in the main body of the hive, one of which is so constructed as to lift out, while the other remains stationary, both of which are provided with suitable gates fastened at the mouths of passages in the sides of the chambers, and which are so constructed as to slide up and down in grooves, thereby affording a means of communication from one chamber to the other. There are two slides fastened over openings in the bottom of the portable chamber, which communicate and rest upon similar openings in a block on the bottom of the main hive, said openings passing out to the end of the hive, and lined with tin or other suitable material to prevent moth from entering. In the bottom of the hive are two doors, and also one door in the bottom of the portable chamber, which are made so as to drop downward, when desired. Glass windows are fastened in the sides of the hive with suitable wooden slides to protect them, which slides are opened or closed when desired. The portable chamber is also provided with a square opening, covered with glass, which is situated directly in front of the glass window in the side of the hive, so as to allow the bees to be seen. One or more honey-caps are placed upon the top of the portable chamber, having a glass to slide up and down upon one side, and provided with openings in the bottom, which communicate with like openings in the top of the portable chamber so as to allow the bees to pass readily up or down.

In the drawing, A represents the main body of the hive with the portable chamber B and stationary or parent chamber C, having suitable gates $b\ b$ that work up and down in grooves fastened at the mouth of a passage in the side of each chamber. These gates may be raised to allow the bees to pass through from one chamber to the other until they have filled the portable chamber, where (if there are enough bees for a new swarm, which can be easily discovered by drawing the slide from the glass window D on the side of the hive, and if ready to remove them) the slides $d\ d$ on the bottom of the chamber B are pushed in by means of a hook which works in narrow openings $e\ e$ provided with suitable doors or coverings in the side of the hive. The gates $b\ b$ are then shut down to prevent the bees from passing through, and the portable chamber lifted out by means of handles $c\ c$ and placed in another hive of the same construction, thus safely swarming the bees without disturbing, injuring, or killing any, and without getting stung. There are three falling doors, $a\ a'\ h$, one, $a$, on the bottom of the parent chamber C, and two for the portable chamber B, one of which, $h$, is fixed in the bottom of the portable chamber B, and the other $a'$ directly under it in the bottom of the hive A. These doors are opened to ventilate the hive in winter, and to allow the dead bees to drop out, thus keeping the hive clean. These doors must be shut up in summer to prevent the entrance of moth. E represents the honey-cap, of which one or more may be used, having a glass to slide in upon one side, and provided with openings in the bottom, which rest on similar openings in the top of the portable chamber B, and is provided with a small opening in the top, which is protected by a slide or door, $m$.

When it is found the honey-caps are sufficiently full, the slide $m$ may be removed and smoke blown down the opening, thus driving the bees down into the portable chamber, after which a flat piece of suitable metal is pushed between the honey-cap and portable chamber B to prevent the bees from coming up, and the honey-cap is then lifted off, and an empty one substituted in its place.

F is an improved device for conducting bees from old hives to the new one, which is so arranged as to fit into a narrow opening, $l$, on the side of the hive.

The advantages of this hive over those now in use will be readily seen from the easy mode of swarming bees, and conducting them from one hive to another without disturbing or injuring any.

Having thus described my invention, what I claim as new, and desire to secure by Letters Patent, is—

The hive, consisting of the fixed chamber C and the detachable chamber B, with a communicating aperture and its sliding valve, window, and guard, in combination with the honey-cap E and openings $i\ i$, all as shown and described.

To the above I have signed my name this 4th day of April, A. D. 1871.

DAVID LOOFBOURROW.

Witnesses:
J. R. DAVIDSON,
J. L. JORDAN.